Oct. 9, 1951     A. OSLUND     2,570,844
HOP-PICKING MACHINE
Filed July 7, 1947     3 Sheets-Sheet 1
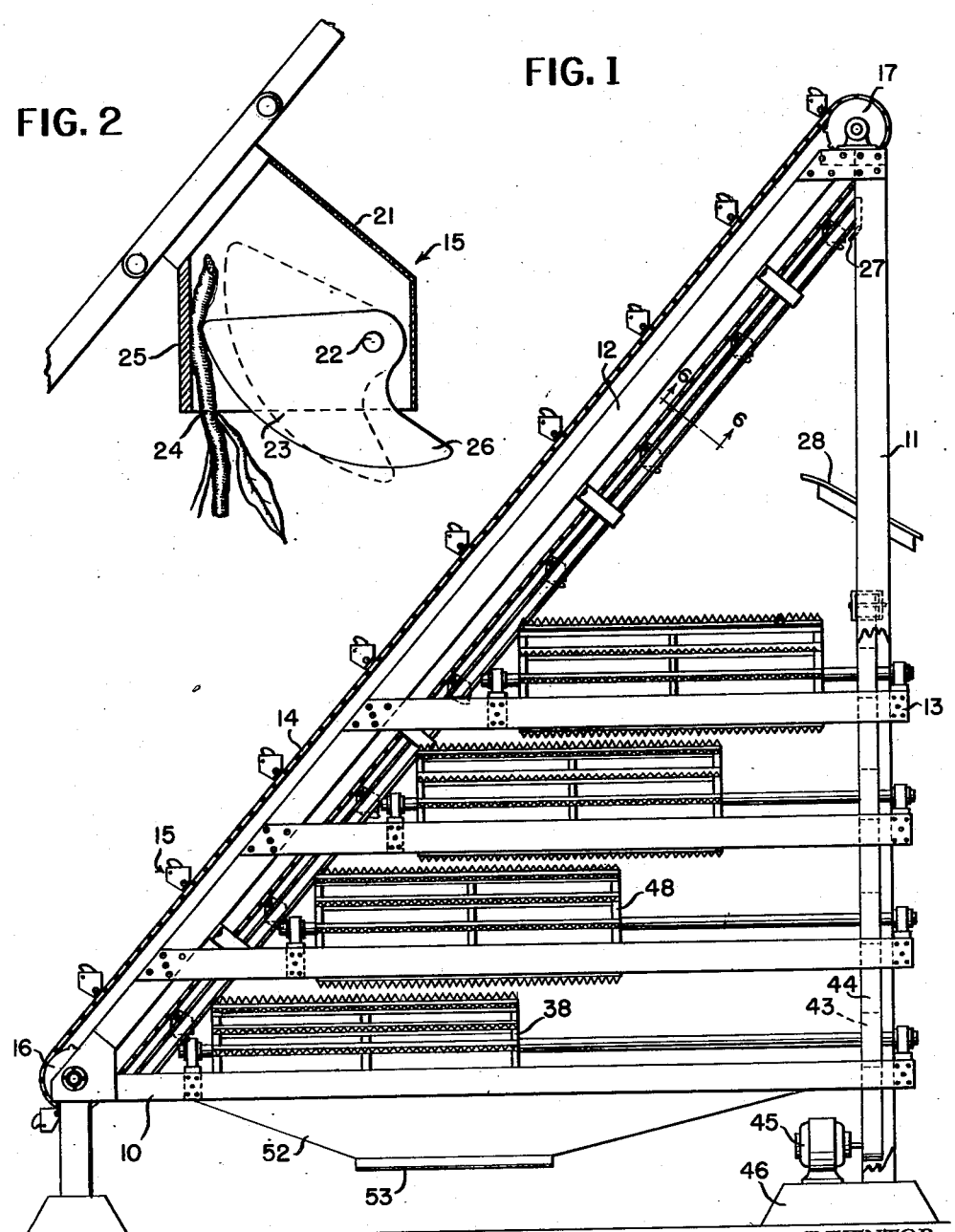
INVENTOR.
AXEL OSLUND
BY *Victor J. Evans & Co.*
ATTORNEYS Oct. 9, 1951 A. OSLUND 2,570,844
HOP-PICKING MACHINE
Filed July 7, 1947 3 Sheets-Sheet 2

INVENTOR.
AXEL OSLUND
BY *Victor J. Evans & Co.*
ATTORNEYS

Oct. 9, 1951   A. OSLUND   2,570,844
HOP-PICKING MACHINE

Filed July 7, 1947   3 Sheets-Sheet 3

INVENTOR.
AXEL OSLUND
BY *Victor J. Evans & Co.*
ATTORNEYS

Patented Oct. 9, 1951

2,570,844

UNITED STATES PATENT OFFICE 2,570,844

HOP-PICKING MACHINE

Axel Oslund, Santa Rosa, Calif.

Application July 7, 1947, Serial No. 759,349

5 Claims. (Cl. 130—30)

This invention relates to hop picking machines.

It is an object of the present invention to provide a hop picking machine for picking hops from hop vines wherein the vines will be extended through the machine in a vertical direction by a traveling conveyor which is connected to the vine stems and through picking drums acting upon opposite sides of the vine as the vine is pulled upwardly and wherein the drums are arranged in pairs working upon opposite sides of the vine and wherein these drums may be staggered with respect to each other throughout the height of the machine.

It is another object of the present invention to provide a vertical hop picking machine wherein the drums are arranged in pairs and wherein the individual drums from the lower position to the top position are brought closer together for each pair so that the last pair of the drums will be so close that they almost touch one another.

Other objects of the present invention are to provide a hop vine picking machine which is of simple construction, inexpensive to manufacture and efficient in operation.

For other objects and for a better understanding of the invention, reference may be had to the following detailed description taken in connection with the accompanying drawing, in which:

Fig. 1 is a side elevational view of the hop picking machine embodying the features of the present invention.

Fig. 2 is a fragmentary and cross-sectional view of one of the vine grasping devices to which the vine is attached for pulling the same through the picking drums.

Figure 3:
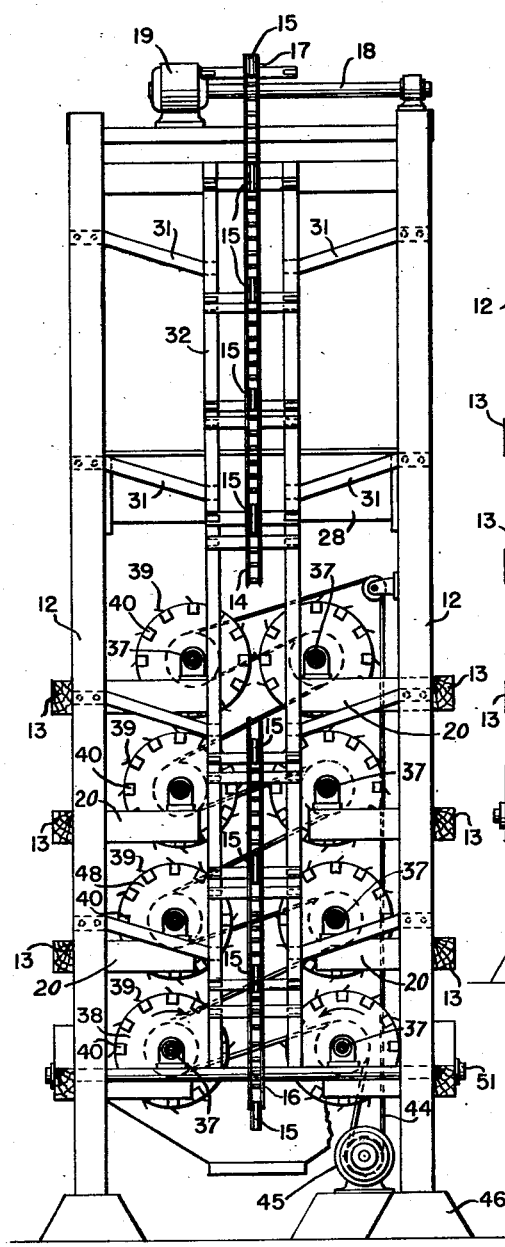
Fig. 3 is a front elevational view of the hop picking machine wherein the drum rollers are arranged in pairs with the respective drums being at the same elevation for the respective pairs and with the drums at the higher elevations being closer together than the drums of the lower elevations.

Referring now to the figures, 10 represents a frame which is formed with two side sections having vertical supports or posts 11, inclined beams 12, longitudinally extending members 13 connecting the vertical beams and with transverse members connecting the two side sections and the inclined supports as shown. Extending along the inclined beams is a conveyor 14 having grasping devices 15 located at spaced intervals therealong. This conveyor is extended between sprockets 16 and 17 and comprises a chain to which these devices 15 are attached. The sprocket 17 at the top is connected by a shaft 18 with a motor 19 located at the top of the frame. The frame is provided with inwardly extended arms 20 on which the picking rollers are carried. The arms extend inwardly from the opposite sides of the frame providing an open vine passage in the central part of the frame.

In Fig. 2, the grasping device 15 is shown to include a casing 21 connected with the chain 14 and having a pivot pin 22 on which a retaining member 23 is pivoted for engagement with the stem of a hop vine as indicated at 24 to cause the same to be pressed against a thickened plate 25 forming a part of the casing 21 and extending upwardly thereinto. As the stem is pulled downwardly, the member 23 is brought against the stem 24 to secure it to the portion 25. To release the stem the member 23 is grasped by its handle 26 to move it upwardly to the dotted line position. Thereafter the stem can be removed.

The stems 24 are thrust into the casing 21 at the bottom of the machine and they are dragged up through the inside of the machine to a top location, where the stem will be released upon the portion 26 engaging with a projection 27 on the frame whereupon the vine stripped of the hops will be released and passed to a chute 28 and dropped out of the machine.

Figure 6:
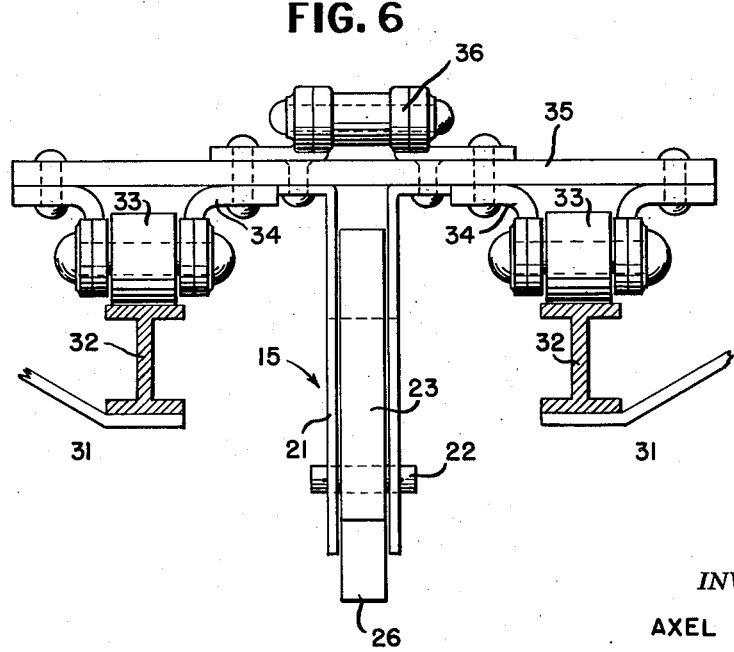
Fig. 6 is an enlarged cross-sectional view taken on line 6—6 of Fig. 1.

Referring now particularly to Figs. 3 and 6, extensions 31 are extended inwardly from the inclined beams 12 and carry track members 32 which extend upwardly and parallel to the beams 12 on which rollers 33 are supported as the chain device 14 travels upwardly on the inside of the frame. The rollers 33 are mounted on brackets 34 which extend downwardly from transversely extending members 35 which are connected to chain elements 36.

At the bottom station there are disposed a pair of picking drums 38 which are journalled in bearings 37 on arms 20. These drums are spaced apart and have picking blades 39 thereon. These picking blades are secured to a member 40 which is in turn disposed in tight fitting engagement within a peripheral recess 41. These blades 39 extend at an angle to the periphery so that a pulling action is had upon the hops on the vines. The drum 38 is on a shaft 42 which has a pulley 43 thereon over which there extends a pulley belt 44 for engagement with a motor pinion of a motor 45 fixed to base 46.

Above the drums 38 are other drums 48 which are spaced at different distances apart than the drum immediately below the same. The top drums are so close together that the blades 39 nearly touch one another. The vine is dragged up slowly between the drums and the hops are dragged from the vines.

Figure 4:
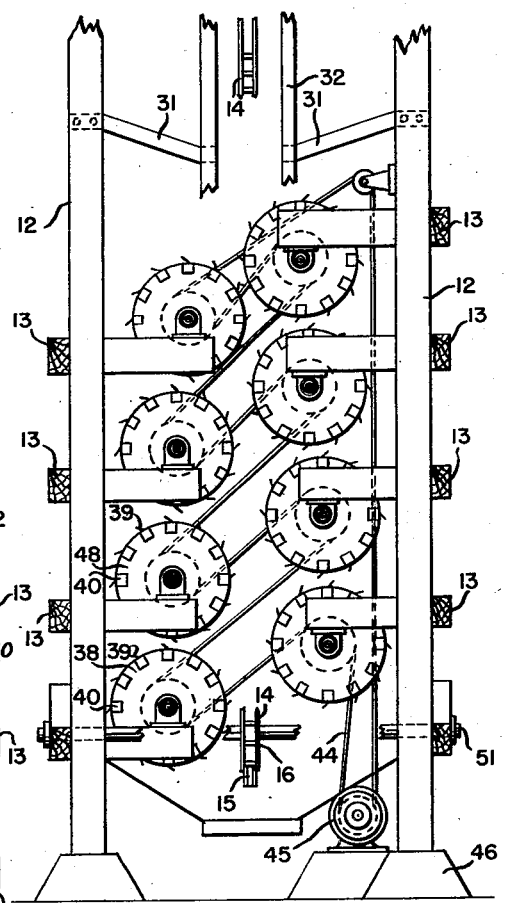
Fig. 4 is a fragmentary front elevational view similar to Fig. 3 except that the picking drums of the respective pairs are at staggered elevations.
Figure 5:
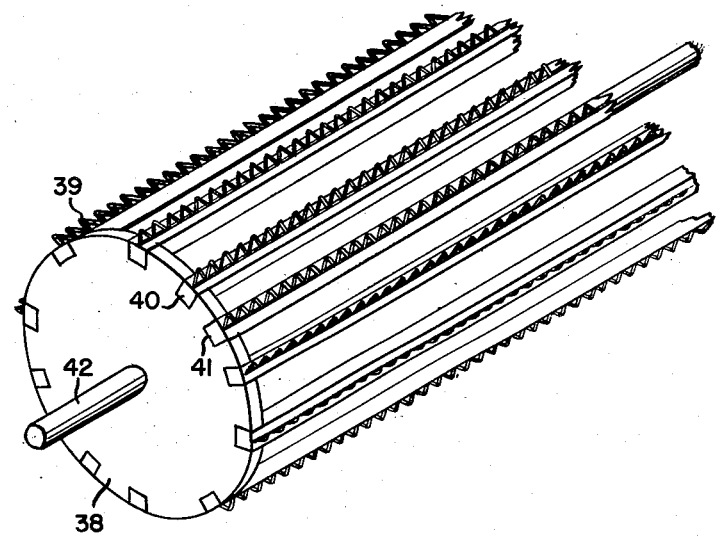
Fig. 5 is a fragmentary and perspective view of one of the picking drums.

In Fig. 4, there is a modified arrangement wherein the individual drums of each pair are staggered relative to each other.

The sprocket 16 is carried on a long shaft 51 which extends across the full width of the frame, Fig. 3.

At the bottom of the frame is a pan 52 with an opening 53 therein for catching the hops which are severed from the vines.

While various changes may be made in the detail construction, it shall be understood that such changes shall be within the spirit and scope of the present invention as defined by the appended claims.

I claim:

1. In a hop picking machine, a pair of triangular-shaped frames including two parallel sections with vertical posts at one side extended upwardly from a base, inclined beams connecting the upper ends of the posts and base, and with the posts and beams connected by horizontally disposed longitudinal and transverse members, said longitudinal members having inwardly extended arms, a series of pairs of rollers with picking teeth on the surfaces thereof positioned longitudinally of the frame and journaled on said arms with the inner ends thereof spaced from the said inclined beams whereby the rollers are staggered longitudinally, the said rollers of the pairs on one side of the frame being spaced from and in longitudinal planes extended between the rollers on the other side, and in staggered relation vertically thereto, and an endless conveyor mounted on said inclined beams with vine-gripping means thereon whereby vines are dragged upwardly and longitudinally between the rollers.

2. In a hop picking machine, a pair of triangular-shaped frames including two parallel sections with vertical posts at one side extended upwardly from a base, inclined beams connecting the upper ends of the posts and base, and with the posts and beams connected by horizontally disposed longitudinal and transverse members, said longitudinal members having inwardly extended arms, pairs of a series of pairs of rollers with picking teeth on the surfaces thereof positioned longitudinally of the frame and journaled on said arms with the inner ends thereof spaced from the said inclined beams whereby the rollers are staggered longitudinally, the said rollers of the pairs on one side of the frame being spaced from and in longitudinal planes extended between the rollers on the other side, and an endless conveyor mounted on said inclined beams with vine-gripping means thereon whereby vines are dragged upwardly and longitudinally between the rollers, said picking rollers positioned wherein the distance between the surfaces of the pairs of rollers increases from the upper pair of rollers to the lower pair.

3. In a hop picking machine, a pair of triangular-shaped frames including two parallel sections with vertical posts at one side extended upwardly from a base, inclined beams connecting the upper ends of the posts and base, and with the posts and beams connected by horizontally disposed longitudinal and transverse members, said longitudinal members having inwardly extended arms, a series of pairs of rollers with picking teeth on the surfaces thereof positioned longitudinally of the frame and journaled on said arms with the inner ends thereof spaced from the said inclined beams whereby the rollers are staggered longitudinally, the said rollers of the pairs on one side of the frame being spaced from and in longitudinal planes extended between the rollers on the other side, an endless conveyor mounted on said inclined beams with vine-gripping means thereon whereby vines are dragged upwardly and longitudinally between the rollers, and means releasing the vines from the conveyor as the vines reach the upper part of the frame.

4. In a hop picking machine, a pair of triangular-shaped frames including two parallel sections with vertical posts at one side extended upwardly from a base, inclined beams connecting the upper ends of the posts and base, and with the posts and beams connected by horizontally disposed longitudinal and transverse members, said longitudinal members having inwardly extended arms, a series of pairs of rollers with picking teeth on the surfaces thereof positioned longitudinally of the frame and journaled on said arms with the inner ends thereof spaced from the said inclined beams whereby the rollers are staggered longitudinally, the said rollers of the pairs on one side of the frame being spaced from and in longitudinal planes extended between the rollers on the other side, an endless conveyor mounted on said inclined beams with vine-gripping means thereon whereby vines are dragged upwardly and longitudinally between the rollers, means actuating the conveyor, and means rotating the picking rollers.

5. In a hop picking machine, the combination which comprises a pair of spaced parallel triangular shape frames having vertically disposed posts forming one of the sides of the frames and inclined beams forming the other of the sides thereof, vertically spaced parallel horizontal beams positioned on the sides of the vertical posts and inclined beams connecting the said beams to the posts, arms carried by the said horizontal beams and extended inwardly into the area between the frames, a plurality of pairs of rollers with picking teeth on the surfaces extended longitudinally of the machine and positioned in planes parallel to the said frames, shafts journaled on the arms extended from the said horizontal beams on which the said rollers are mounted, said shafts positioned whereby one end of each of the said rollers is positioned adjacent the said inclined beams and the other extended toward the vertically disposed posts, said pairs of rollers positioned in superimposed relation with the roller of each pair on one side of the machine positioned in a horizontal plane extended between the rollers on the opposite side of the machine, and with the inner surfaces of the rollers of the upper pair in overlapping relation, and a conveyor with hop gripping elements thereon carried by the said inclined beams and positioned to drag hops upwardly between the rollers of the pairs.

AXEL OSLUND.

(References on following page)

REFERENCES CITED

The following references are of record in the file of this patent:

UNITED STATES PATENTS

| Number | Name | Date |
|---|---|---|
| Re. 22,889 | Dauenhauer | June 17, 1947 |
| 503,190 | Beardsley | Aug. 15, 1893 |
| 563,504 | Moore et al. | July 7, 1896 |
| 1,054,119 | Horst | Feb. 25, 1913 |
| 1,054,122 | Horst | Feb. 25, 1913 |
| 2,114,727 | Thys | Apr. 19, 1938 |
| 2,187,526 | Thys | Jan. 16, 1940 |